(12) United States Patent
Streubel et al.

(10) Patent No.: US 6,510,763 B1
(45) Date of Patent: Jan. 28, 2003

(54) COMPOSITE CONTROL ARM SHAFT

(75) Inventors: Wolfgang Streubel, Detmold (DE); Udo Klasfauseweh, Gütersloh (DE); Wulf Härtel, Detmold (DE)

(73) Assignee: Benteler AG, Paderborn (DE)

( * ) Notice: Subject to any disclaimer, the term of this patent is extended or adjusted under 35 U.S.C. 154(b) by 0 days.

(21) Appl. No.: 09/315,685

(22) Filed: May 20, 1999

(30) Foreign Application Priority Data

May 26, 1998 (DE) .................................. 298 09 241 U

(51) Int. Cl.[7] .................................................. G05G 1/00
(52) U.S. Cl. ........................................................ 74/588
(58) Field of Search .............................. 74/579 R, 580, 74/586, 587, 588, 593, 594, 579 E, 579 F, 545, 594.1

(56) References Cited

U.S. PATENT DOCUMENTS

| | | | | |
|---|---|---|---|---|
| 1,959,670 A | * | 5/1934 | Hamilton | ................. 74/579 R |
| 3,106,853 A | * | 10/1963 | Herr et al. | ..................... 74/545 |
| 4,841,801 A | * | 6/1989 | Tice | .......................... 74/579 R |
| 6,079,294 A | * | 6/2000 | Mizobe | ...................... 74/594.1 |

FOREIGN PATENT DOCUMENTS

| | | | |
|---|---|---|---|
| DE | 3511495 | 10/1986 | |
| DE | 196 53 959 C1 | 2/1998 | |
| EP | 0229576 | 7/1987 | |
| FR | 1230096 | * 9/1960 | ................ 74/545 |

* cited by examiner

Primary Examiner—Chong H. Kim
(74) Attorney, Agent, or Firm—Friedrich Kueffner

(57) ABSTRACT

A composite control arm shaft for motor vehicles includes two longitudinal control arms connected through a transverse beam, wherein the transverse beam has a trough-shaped double-wall torsion section essentially having the form of a V or U, approximately circular or oval tubular end sections and transition sections whose cross-section continuously changes from the end sections toward the torsion section. The transverse beam has in the transition sections thereof an internal partial foam filling.

6 Claims, 2 Drawing Sheets

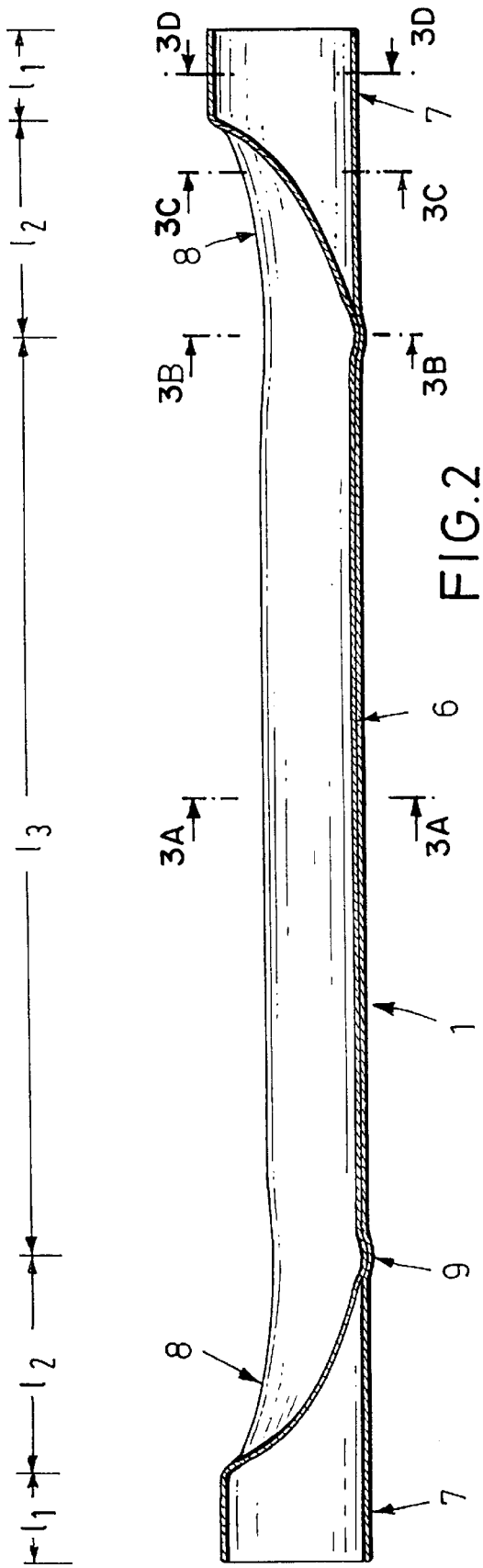
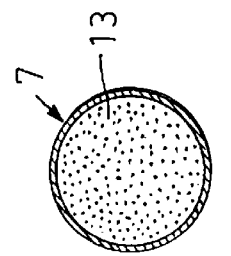
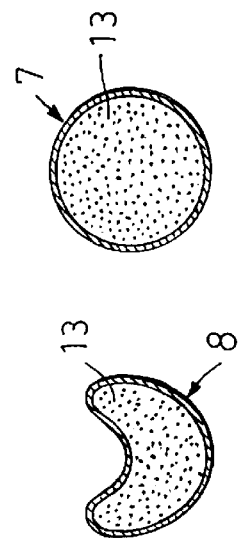
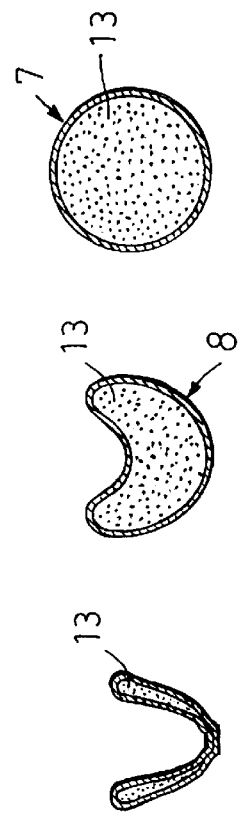
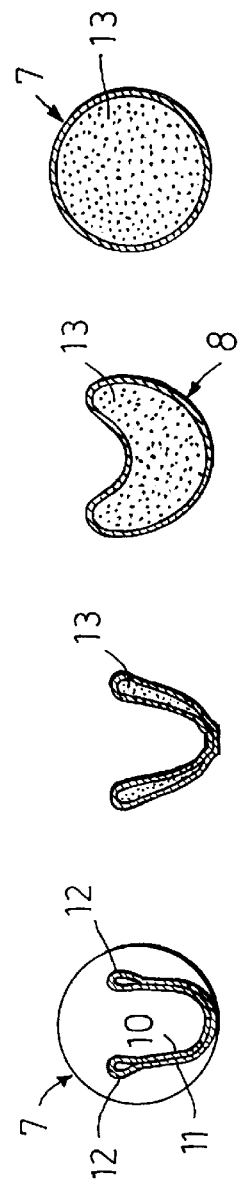

COMPOSITE CONTROL ARM SHAFT

BACKGROUND OF THE INVENTION

1. Field of the Invention

The present invention relates to a composite control arm shaft for motor vehicles which includes two longitudinal control arms connected through a transverse beam, wherein the transverse beam has a trough-shaped double-wall torsion section essentially having the form of a V or U, approximately circular or oval tubular end sections and transition sections whose cross-section continuously changes from the end sections toward the torsion section.

2. Description of the Related Art

EP 0 229 576 B1 discloses a composite control arm shaft manufactured from a pipe, wherein the wheel-supporting longitudinal control arms extend parallel to each other and are tubular without being deformed. The transverse beam connecting the longitudinal control arms is stiff with respect to bending but soft with respect to torsion and has, except for the tubular ends which are also circular, a cross-section which is L-shaped, V-shaped, T-shaped, U-shaped, X-shaped or H-shaped.

However, the use of a composite control arm shaft of the type described above has in the past posed difficulties in practice because of the demanded service life. In U-shaped and V-shaped transverse beams, the reason for not reaching a satisfactory service life is the high load acting in the transition areas between the deformed and the non-deformed length sections, so that a premature failure occurs in these length sections in the case of a long-term load.

A transverse beam for a composite control arm shaft which is substantially improved over the one described above is disclosed in DE 196 53 959 C1.

In addition, DE 35 11 495 A1 discloses a wheel control arm for motor vehicles which includes a foam core-supported base body. The wheel control arm manufactured of composite fiber material has a base body of hard foam corresponding to the basic shape of the control arm. Reinforcements, such as inner and outer sectional rods and cover plates, are mounted around this base body to produce a dimensionally correct final shape.

SUMMARY OF THE INVENTION

Therefore, starting from the prior art discussed above, it is the primary object of the present invention to provide a composite control arm shaft which can be subjected to high loads, wherein the composite control arm shaft is improved with respect to the stiffness and strength behavior and has a longer service life.

In accordance with the present invention, the transverse beam has in the transition sections thereof an internal partial foam filling.

Consequently, at the core of the invention is the measure of providing the transverse beam of the composite control arm shaft in the transition sections from the V-shaped or U-shaped torsion section to the approximately circular or oval tubular end sections with an inner partial foam filling or core.

This measure results in a reinforcement of the composite control arm shaft and an increase of its service life.

The targeted reinforcement or stiffening in the transition sections of the transverse beam from the V-shaped or U-shaped cross-section toward the ends is of a material whose volume to a large extent is composed of hollow spaces (bubbles, pores). This results in an effective increase of the stiffness of the transitions while simultaneously increasing the capacity of absorbing or converting energy. The density of the foam filling or core in the transition sections of the transverse beam can be adapted in a targeted manner to the composite control arm shaft or the type of motor vehicle.

As practical tests have shown, the foam filling results in a higher energy absorption in the case of high loads. This has a particularly positive effect in the case of a crash.

In addition, the composite control arm shaft according to the present invention has an improved frequency behavior with respect to alternating tensile and compressive loads. The total configuration of the composite control arm shaft makes possible section moduli which are adapted to dynamic loads. This is to a great extent influenced by the foam filling or core in the transition areas from the torsion section to the ends of the transverse beam. The partial adhesion resulting from the foam filling facilitates an efficient transfer of the torsion and bending forces from the longitudinal control arms into the transverse beam, wherein the forces are compensated in the torsion section of the transverse beam. As a result, the composite control arm shaft according to the present invention has a particularly good static and dynamic load behavior and reaches a long service life.

The invention further results in a weight optimization and a material reduction of the composite control arm shaft. When the wall thicknesses or cross-sections of the transverse beam are reduced, the inner partial foam filling makes it possible to reduce the weight while the strength of the structural component is identical, and the utilization of the available structural space is optimized.

The internal foam filling in the transition sections additionally makes it unnecessary to use additional gusset plates or similar mechanical constructions between the transverse beam and the longitudinal control arms. This results in a further weight reduction as compared to comparable composite control arm shafts.

In accordance with a feature of the present invention, the foam is a synthetic multicomponent foam. The foam used in practice may be a foam on the basis of a synthetic material, such as epoxy foam, polypropylene foam or polyurethane foam. The foams are either injected into the structural components or are foamed within the structural component itself. It is additionally possible in practice to apply the initial foam material in the form of crystals in the transition sections and to foam the material subsequently with the use of energy. This is usually done by heating.

In accordance with another feature, a metal foam may be used.

The metal foams may be aluminum foam or steel foams. However, basically other metal foams can also be used, preferably light metal foams, such as magnesium foam. Moreover, a multicomponent foam, such as a foam of aluminum and magnesium can be used. The components of the metal foam can be adapted with respect to their operation to the configuration of the composite control arm shaft and the load behavior thereof.

For manufacturing metal foam, a metal powder or a metal alloy powder with a particle size of preferably $\leq 300\ \mu m$ is used. This powder is mixed with small quantities of a powder-metallurgical expanding or foaming agent, such as titanium hybrid, with a particle size of $\leq 65\ \mu m$. The mixture results in a homogenous distribution of the gas-separating expanding or foaming agent in the metal powder. Subsequently, the metal powder mixture is compacted or directly introduced into the transverse beam.

Foaming takes place in the next process step by heating the transverse beam or the transition sections.

In accordance with another feature, stiffening fibers can additionally be embedded in the foam matrix of the foam filling. The fibers may be of synthetic material or of metal. The use of mineral fibers is also conceivable.

The material of the foam filling is inert, i.e., its components are not supposed to attack and corrode the material of the transverse beam or of the composite control arm shaft. It is useful if the foam material is corrosion-inhibiting. This can be achieved by adding suitable additives.

In summary, the composite control arm shaft can be manufactured efficiently and inexpensively. By introducing foam into the transition sections of the transverse beam, a structural composite area with increased stiffness is produced. This improves the dynamic and static load behavior of the composite control arm shaft. In addition, the properties with respect to noise, vibration and strength are improved in the transition sections.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

In the drawing:

FIG. 2 is a vertical longitudinal sectional view of a transverse beam;

FIG. 3A is a vertical transverse sectional view taken along sectional line 3A—3A of FIG. 2;

FIG. 3B is a vertical transverse sectional view taken along sectional line 3B—3B of FIG. 2;

FIG. 3C is a vertical transverse sectional view taken along sectional line 3C—3C of FIG. 2; and FIG. 3D is a vertical transverse sectional view taken along sectional line 3D—3D of FIG. 1;

DESCRIPTION OF THE PREFERRED EMBODIMENTS

Figure 1:
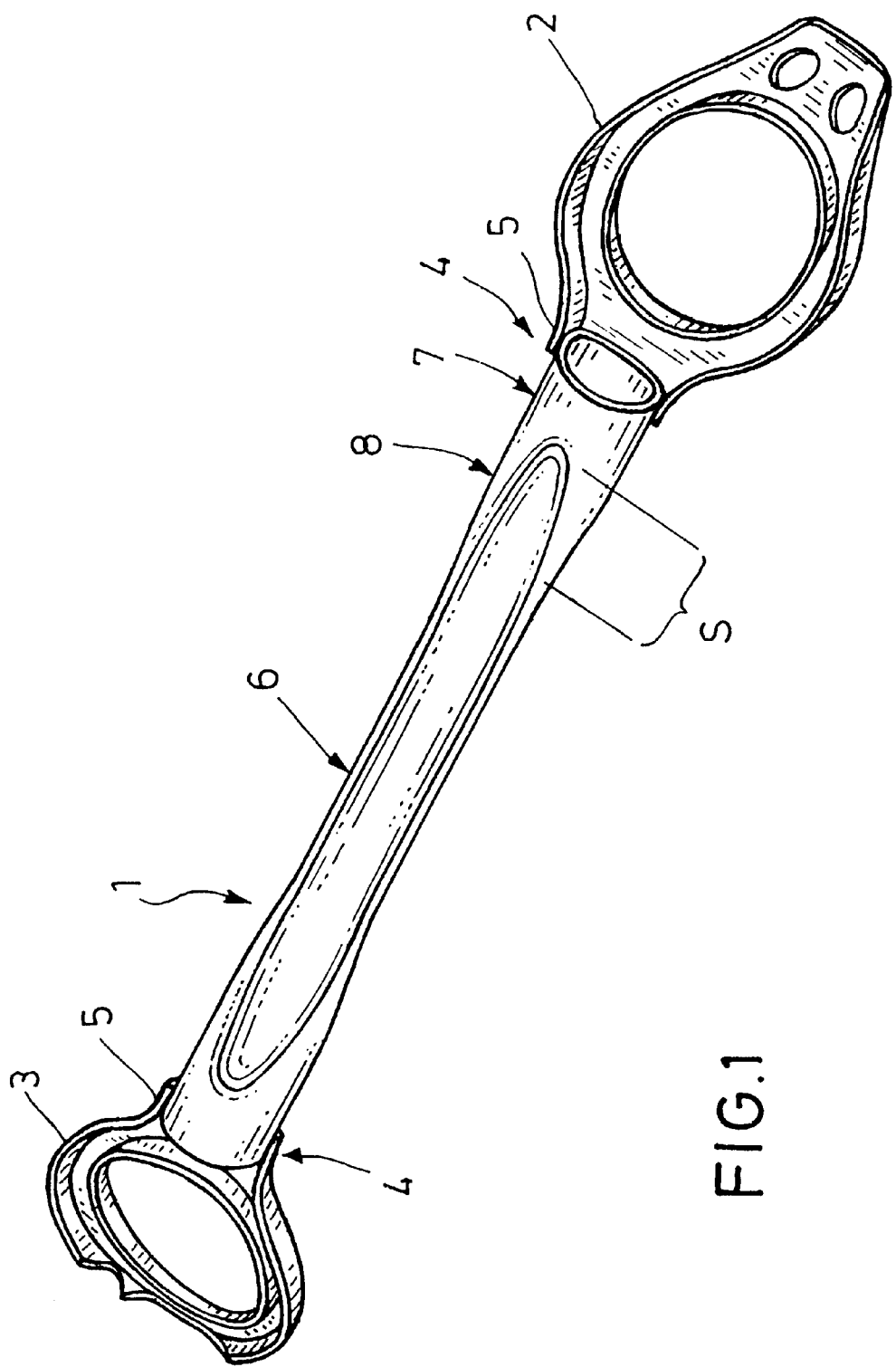
FIG. 1 is a perspective view of a transverse beam with portions of longitudinal control arms.

FIGS. 1 and 2 of the drawing show a transverse beam 1 for a composite control arm shaft, otherwise not illustrated in detail, of a motor vehicle.

The transverse beam 1 connects two longitudinal control arms 2, 3, wherein, for clarity's sake, only a portion of the connecting area to the transverse beam 1 is shown at each end. The longitudinal control arms 2, 3 have in the connecting areas a receiving area 5 which is adapted to the cross-sectional configuration of the ends 4 of the transverse beam 1. The transverse beam 1 is with its ends 4 inserted in the receiving areas 5 and joined thereto.

The transverse beam 1 has a trough-shaped double-wall torsion section 6 with an essentially V-shaped profile. The V-shaped profile is obtained by deforming an originally circular pipe whose cross-section is unchanged in the end sections 7 over the length 1, as shown in FIG. 2. The circular cross-section changes continuously in the transition sections 8 having the length $l_2$ into the U-shaped trough-like cross-section which extends over the middle torsion section 6 of the transverse beam 1 having the length $l_3$.

The length $l_3$ is significantly greater than the lengths $l_1$, and $l_2$. The continuous transition from the circular cross-section in the end sections 7 over the transition sections 8 to the trough-shaped cross-section in the torsion section 6 can be seen in FIGS. 3A through 3D.

As can further be seen in FIG. 2, the transverse beam 1 is provided at the transition from the torsion section 6 to the transition section 8 with bead-like embossments 9.

While the trough walls 10, 11 are in close contact with each other in the torsion section 6 with the exception of the bending radii at the ends, as seen in FIG. 3A, the distance between the walls 10, 11 increases from the torsion section 6 toward the end sections 7, as illustrated in FIGS. 3A to 3D.

In the transition sections 8, the transverse beam 8 is stiffened in a targeted manner by means of an internal partial foam filling 13. The foam filling 13 may be of a synthetic material or it may be metal foam. As can be seen in FIG. 2, the foam filling 13 extends approximately to the middle of the end sections 7 in accordance with sectional plane D—D. In FIG. 1 the area filled with foam is denoted by reference character S.

The foam filling 13 forms a stiffening body or composite body and ensures an effective increase of the stiffness in the transition sections 8. The partial foam filling 13 also has a positive effect on the capacity to absorb and convert energy. Moreover, the foam filling 13 increases the service life of the composite control arm shaft which is dynamically stressed under load and is subjected to vibrating loads.

While specific embodiments of the invention have been described in detail to illustrate the inventive principles, it will be understood that the invention may be embodied otherwise without departing from such principles.

We claim:

1. A composite control arm shaft for motor vehicles, comprising two longitudinal control arms and a transverse beam connecting the longitudinal control arms, the transverse beam comprising a trough-shaped double-wall torsion section essentially having a V-shaped or U-shaped profile, approximately circular or oval tubular end sections, and transition sections connecting the end sections to the torsion section, wherein the transition sections have a cross-section which continuously changes from the end sections toward the torsion section, further comprising an internal partial foam filling in each transition section of the transverse beam.

2. The composite control arm shaft according to claim 1, wherein the foam filling is comprised of a multicomponent synthetic foam.

3. The composite control arm shaft according to claim 1, wherein the foam is a metal foam.

4. The composite control arm shaft according to claim 3, wherein the metal foam is an aluminum foam or a steel foam.

5. The composite control arm shaft according to claim 1, further comprising reinforcing fibers embedded in the foam.

6. The composite control arm shaft according to claim 1, wherein the foam is corrosion-inhibiting.

* * * * *